United States Patent
Harada et al.

(10) Patent No.: US 8,350,976 B2
(45) Date of Patent: Jan. 8, 2013

(54) LIQUID CRYSTAL DISPLAY DEVICE

(75) Inventors: Kazuyuki Harada, Ishikawa-ken (JP);
Hiroyuki Kimura, Saitama-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 456 days.

(21) Appl. No.: 12/538,187

(22) Filed: Aug. 10, 2009

(65) Prior Publication Data

US 2010/0060814 A1   Mar. 11, 2010

(30) Foreign Application Priority Data

Sep. 5, 2008 (JP) ................................ 2008-228298

(51) Int. Cl.
*G02F 1/1333* (2006.01)
(52) U.S. Cl. .......................................... 349/40; 349/43
(58) Field of Classification Search ................... None
See application file for complete search history.

(56) References Cited

U.S. PATENT DOCUMENTS

| | | | |
|---|---|---|---|
| 8,018,561 B2* | 9/2011 | Obi et al. ...................... | 349/138 |
| 2005/0140570 A1* | 6/2005 | Tabatake et al. ............... | 345/3.1 |
| 2007/0200990 A1* | 8/2007 | Hirosawa et al. ............. | 349/129 |
| 2008/0192160 A1 | 8/2008 | Yoshida et al. | |

OTHER PUBLICATIONS

U.S. Appl. No. 13/371,798, filed Feb. 13, 2012, Harada, et al.
U.S. Appl. No. 12/938,591, filed Nov. 3, 2010, Harada, et al.

* cited by examiner

*Primary Examiner* — Thanh-Nhan P Nguyen
(74) *Attorney, Agent, or Firm* — Oblon, Spivak, McClelland, Maier & Neustadt, L.L.P.

(57) ABSTRACT

A liquid crystal display device includes an array substrate, a counter substrate and a liquid crystal layer having liquid crystal molecules interposed therebetween. The liquid crystal molecules are aligned in a direction normal to a surface of the substrates under a condition where no electrical voltage is supplied between a picture electrode and a counter electrode. An alignment control device is provided at the counter substrate and configured to control the alignment of the liquid crystal molecules under a condition where an electric field is applied between the picture electrode and the counter electrode. A scanning line crossing a pixel is divided into first and second segments. The array substrate includes a connecting element to connect the first and second segments opposite the alignment control device.

8 Claims, 13 Drawing Sheets

LIQUID CRYSTAL DISPLAY DEVICE

CROSS-REFERENCE TO RELATED APPLICATIONS

This application is based upon and claims the benefit of priority from prior Japanese Patent Application No. 2008-228298 filed Sep. 5, 2008, the entire contents of which are incorporated herein by reference.

BACKGROUND OF THE INVENTION

1. Field of the Invention

The present invention relates generally to a liquid crystal display device, and more particularly to a liquid crystal display device of a vertical alignment mode.

2. Description of the Related Art

Liquid crystal display devices are widely used as display devices for various kinds of equipment such as personal computers, OA equipments, and TV sets because the display devices have many advantages such as lightness, compactness and low power consumption. In recent years, the liquid crystal display device has also been used in mobile terminal equipments such as a mobile phone, a car navigation device and a game player.

The liquid crystal display devices include thin-film transistors (TFTs) as switching elements of pixels using semiconductor layers, such as amorphous silicon film and poly-silicon film. The thin-film transistors are formed on an optically transparent substrate. Recently, the thin-film transistors made from the poly-silicon film for driver circuits have been also formed on the same substrate as that for the switching transistors because the mobility of the poly-silicon by electric field effect is greater than that of the amorphous silicon. Since the substrate, however, is made of a glass substrate, which is optically transparent and electrical insulating, static electricity is charged on the substrate. The static electricity may destroy the switching transistors and/or the driver circuits to significantly lower a yield of the liquid crystal display device.

In the case, particularly, that a gate insulation film is formed in a small polycrystalline silicon pattern on the substrate, that long gate electrode leads are formed on the gate insulation film, and that electric capacitors are formed between the polycrystalline silicon patterns and the gate electrode leads, electrostatic destruction may occur between the polycrystalline silicon pattern and the gate electrodes. In other words, it is highly possibly for the static electricity to destroy the thin-film transistors.

Japanese laid open patent application 2005-134446 discloses a construction to suppress such problem. In the Japanese laid open application, gate electrode lines formed on a glass substrate are separated and connected by a connecting element for respective pixels to shorten lengths of the gate electrode lines. When the substrate is charged with static electricity, the increase in voltages between the gate electrode lines and the switching elements are effectively suppressed so that electrostatic destruction of the switching elements can be prevented.

Generally, wiring layers used in the liquid crystal display device are desired to have a low resistance characteristic. Accordingly, the wiring layers are formed of electrically conductive material such as aluminum, molybdenum and tungsten. However, since the above conductive materials are not optically transparent, portions of the pixels on which the wiring layers are formed are optically shielded, which results in decrease of brightness of the display. In the technology disclosed in the Japanese laid open patent application, the gate electrode lines are arranged in line so as to cross the pixels and are divided into two segments in the pixel. The segments are connected by a connecting element. The connecting element is designed to have a larger width than the segments in consideration of a margin to accommodate a mask shift during a manufacturing process. The connecting element with a large width results in decrease of an aperture ratio which influences the brightness of the display due to increase of the shield area by the connecting element.

On the other hand, in order to obtain a high quality display, further characteristics such as a wide viewing angle and a high contrast ratio are requested in the liquid crystal display device. Recently, a Multi-Domain type liquid crystal display device using Multi-Domain Vertical Alignment (MVA) mode in which a pixel includes a plurality of domains, has been used as shown in Japanese patent application 2008-197493. In this type liquid crystal display device, the wide viewing angle is achieved by the plurality of domains. Further, a high contrast ratio which results in more complete black display is obtained because a retardation of the liquid crystal material becomes nearly zero. The liquid crystal molecules around an alignment film are aligned in a horizontal direction with respect to the substrate by adopting a homeotropic alignment treatment.

BRIEF SUMMARY OF THE INVENTION

The present invention has been made to address the above mentioned problems.

Thus, according to one aspect of the invention, there is provided a liquid crystal display device including: an array substrate including pixels arranged in a matrix, a picture electrode provided for each pixel, a scanning line extending in a row direction and a signal line extending in a column direction with an interposed insulation layer; a counter substrate including a common counter electrode for the plurality of pixels, the counter substrate facing the array substrate; a liquid crystal layer including liquid crystal molecules held between the array substrate and the counter substrate, wherein the liquid crystal molecules are aligned substantially in a direction normal to a surface of the substrates under a condition where no electric field is applied between the picture electrodes and the counter electrode; and an alignment control device configured to control the alignment of the liquid crystal molecules under a condition where an electric field is applied between the picture electrodes and the counter electrode, the alignment control device crossing the pixel so as divide the pixel into first and second display areas, wherein the scanning line includes a first segment and a second segment corresponding to the first and second display areas in each pixel, and wherein the array substrate further includes a connecting element to connect the first and second segments of the scanning lines opposite the alignment control device.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
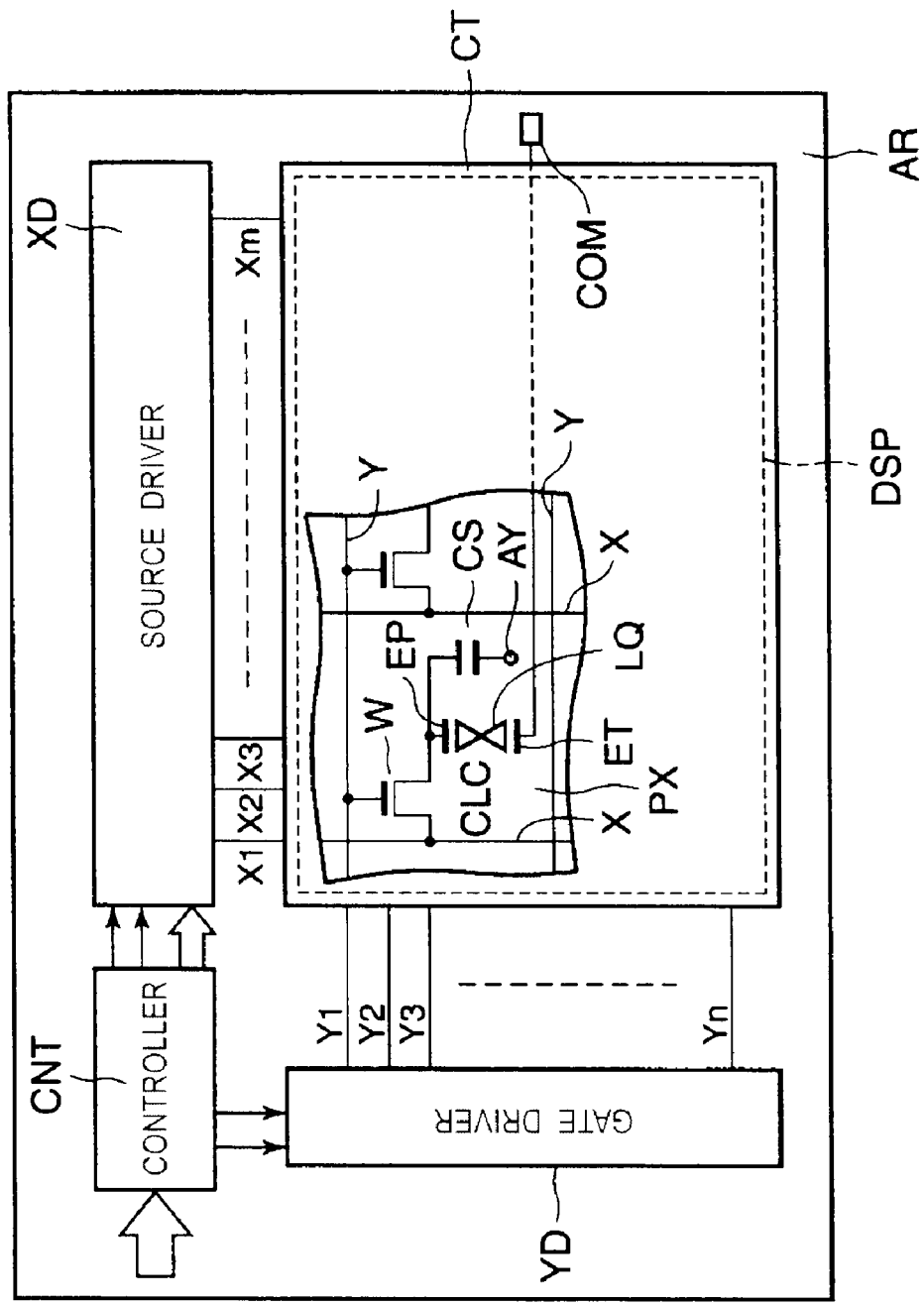
FIG. 1 is a schematic block diagram showing a liquid crystal display device using an in-plane-switching mode according to one embodiment of the invention.

A liquid crystal display device according to an exemplary embodiment of the present invention will now be described with reference to the accompanying drawings wherein the same or like reference numerals designate the same or corresponding parts throughout the several views.

Figure 2:
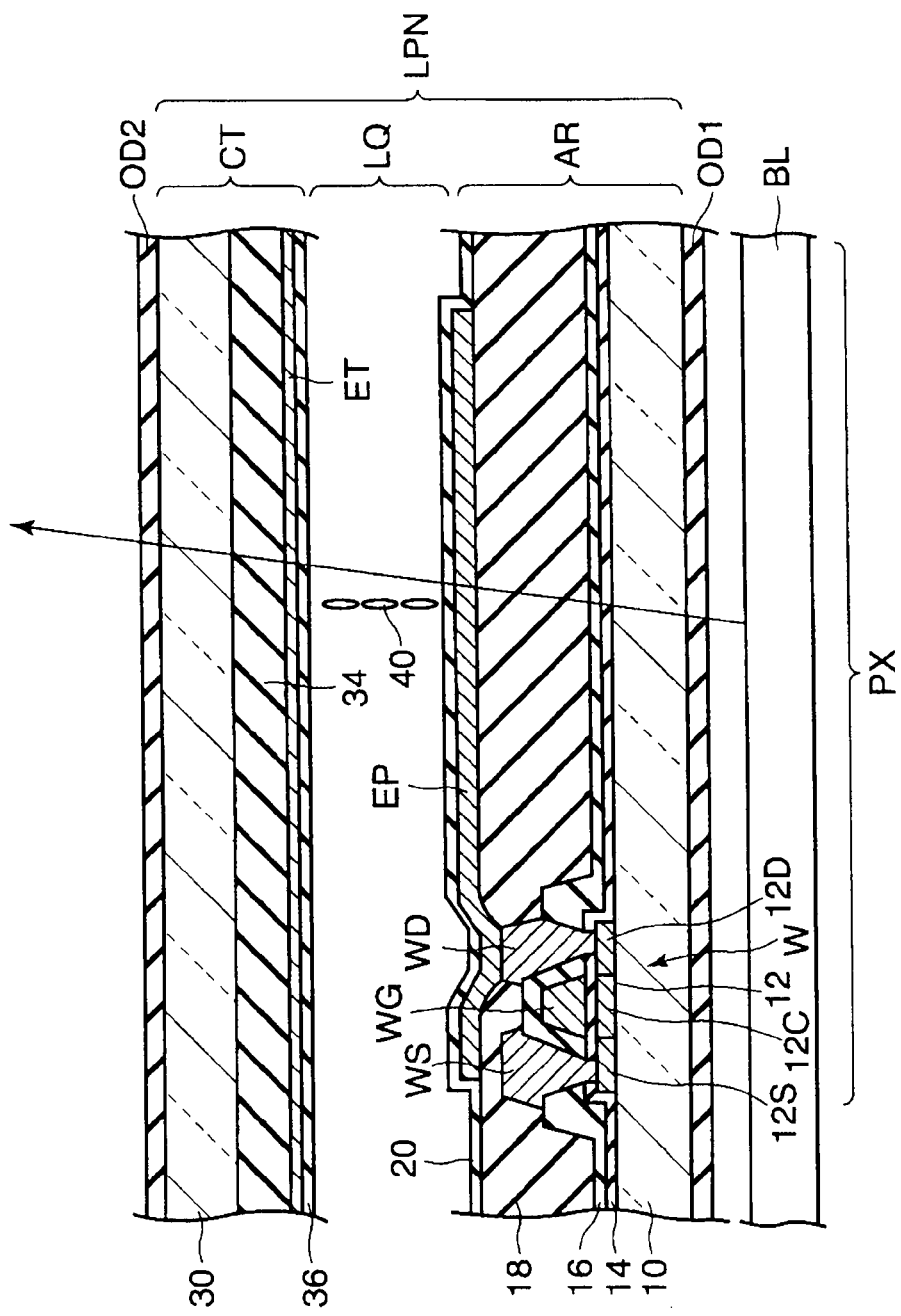
FIG. 2 is a cross-sectional view of an array substrate and a counter substrate used in the liquid crystal display device shown in FIG. 1.

FIG. 1 and FIG. 2 show a liquid crystal display device of transmissive mode according to a first embodiment of the invention, in which pictures are displayed by selectively transmitting light from a backlight unit through a pixel. Of course, the present invention is also applicable to a reflective type liquid crystal display device.

The liquid crystal display device includes an active matrix type liquid crystal display panel LPN. The liquid crystal display panel LPN includes a pair of electrode substrates, which are an array substrate (first substrate) AR and a counter-substrate (second substrate) CT facing each other and sandwiching a liquid crystal layer LQ which functions as a light modulation layer. The liquid crystal display panel LPN includes an approximately rectangular active area DSP to display pictures. The active area DSP consists of an (m×n) pixels PX arranged in a matrix.

The liquid crystal display device includes a first optical element OD1 formed on one outer surface of the liquid crystal display panel LPN (e.g. a surface of the array substrate AR, opposite to a surface which contacts with the liquid crystal layer), and a second optical elements OD2 formed on another outer surface of the liquid crystal display panel LPN (e.g. a surface of the counter substrate CT, opposite to a surface which contacts with the liquid crystal layer). Further, the liquid crystal display device includes a backlight unit BL to illuminate the liquid crystal display panel LPN from the first optical element OD1 side. The array substrate AR is formed of an insulating substrate 10 with a light transmissive characteristic such as a glass substrate and a silica substrate. The array substrate AR includes (m×n) picture electrodes EP arranged in the respective pixels PX in the display area DSP, n scanning lines (Y1~Yn) which extend in a row direction of the pixels PX, m signal lines (X1~Xm) which extend in a column direction of the pixels PX crossing the row direction, (m×n) switching elements W which are disposed near the intersections of the scanning lines Y and the signal lines X, and auxiliary capacitance lines AY arranged in the row direction as well as the scanning lines Y so as to form auxiliary capacitance CS by capacitance coupling with a picture electrode EP, in parallel with a LCD capacitance CLC formed in each pixel PX.

The scanning lines Y and the auxiliary capacitance lines AY are arranged substantially in parallel and may be formed of same material. The auxiliary capacitance lines AY are arranged so as to face the picture electrode EP interposing an insulation interlayer 16. The signal lines X are arranged so as to cross orthogonally with the scanning lines Y and the auxiliary capacitance lines AY with an interposed insulation interlayer 16. The signal lines X, the scanning lines Y and the auxiliary capacitance lines AY are made of an electrically conductive material such as aluminum, molybdenum, tungsten and titanium.

Each switching element W is, for instance, formed of an n channel type thin-film transistor. The switching element W includes a semiconductor layer 12 formed on an insulation substrate 10. The semiconductor layer 12 may be poly-silicon or amorphous silicon. In this embodiment, poly-silicon is used. The semiconductor layer 12 includes a drain region 12D and a source region 12S with an interposed channel region 12C. The semiconductor layer 12 is covered by a gate insulation layer 14.

The gate electrode WG of the switching element W faces the channel region 12C with the gate insulation layer 14 interposed therebetween. The gate electrode WG is connected to the scanning line Y, or integrally formed with the scanning line Y, and is arranged on the gate insulation layer 14 with the scanning line Y and the auxiliary capacitance lines AY. The gate electrode WG, the scanning line Y and the auxiliary capacitance lines AY are formed by using the same material and the same process, and are covered with an insulation interlayer 16. The gate insulation layer 14 and the insulation interlayer are 16 are formed of inorganic material such as a silicon oxide layer and a silicon nitride layer.

The source electrode WS and the drain electrode WD of the switching element W are arranged at both ends of the gate electrode WG on the insulation interlayer 16. The source electrode WS is connected to the signal line X or formed integrally with the signal line X and contacts with the source region 12S through a contact hole which penetrates the gate insulation layer 14 and the insulation interlayer 16. The drain electrode WD is connected to the picture electrode EP or formed integrally with the picture electrode EP and contacts with the drain region 12D through a contact hole which penetrates the gate insulation layer 14 and the insulation interlayer 16. The source electrode WS, the drain electrode WD of the switching element W and the signal line X may be formed using the same material and the same process, and covered with an insulation layer 18 which is formed of organic material.

The picture electrode EP is arranged on the insulation layer 18 and connected to the drain electrode WD through a contact hole formed in the insulation layer 18. The picture electrode EP is, for example, formed of conductive material having a light transmissive characteristic, such as Indium Ting Oxide (ITO) and Indium Zinc Oxide (IZO).

A surface of the array substrate AR, which faces the liquid crystal layer LQ, is covered with a first alignment film 20.

On the other hand, the counter substrate CT is formed of an insulative substrate 30 having a transmissive characteristic, such as a glass substrate and a silicate glass. The counter substrate CT includes a counter electrode ET on a surface of the insulative substrate 30, which faces the liquid crystal layer LQ in the display area DSP.

The counter electrode ET, which is formed of a conductive material having an optically transmissive characteristic, is arranged so as to face the picture electrode EP. In the color type liquid crystal display, a color filter layer 34 is formed on the surface of the counter substrate CT corresponding to each pixel PX.

The color filter layer 34 is formed of resin materials which are colored in a plurality of colors, for example, in the three primary colors of red (R), green (G) and blue (B). The red color resin, green color resin and blue color resin are disposed in association with a red pixel PXR, a green pixel PXG and a blue pixel PXB, respectively. The color filter layer 34 may be disposed on the array substrate AR while the color filter layer 34 is formed on the counter substrate CT in FIG. 2. In this case, the insulation layer 18 may be replaced by the color filter layer 34.

Each pixel PX is segmented by a black matrix (not shown). The black matrix is, for example, formed of black color resin and arranged so as to face wiring layers such as the scanning line, the signal line X and the switching element W. An overcoat layer may be arranged between the color filter layer 34 and the counter electrode ET so as to smooth the irregular surface of the color filter layer 34. The surface of the counter substrate CT, which contacts the liquid crystal layer LQ, is covered with a second alignment film 36.

The array substrate AR and the counter substrate CT are arranged so that the first alignment film 20 and the second alignment film 36 face each other. A spacer, for example, a columnar spacer (not shown) made of resin that is integrally formed with either one of the counter substrate CT and the array substrate AR, is provided to maintain a predetermined gap between the substrates. The substrates are attached by a seal element to maintain the gap therebetween.

The liquid crystal layer LQ is formed by injecting liquid crystal material consisting of liquid crystal molecules with a negative dielectric constant anisotropy into the gap formed between the first alignment film 20 on the array substrate AR and the second alignment film 36 on the counter substrate CT.

The first alignment film 20 and the second alignment film 36 work to align the liquid crystal molecules 40 in a vertical direction with respect to the array substrate AR and the counter substrate CT when a voltage is not applied, that is, an electric field is not formed between the picture electrode EP and the counter electrode ET. A thin film with a vertical alignment characteristic and an optically transmissive characteristic is used to form the first and the second alignment films 20 and 36. In case that TFT switching transistors made of poly-silicon are used to form the switching elements W, some parts of a gate driver YD connected to the scanning lines Y and a source driver XD connected to the signal lines X may be integrally formed with the switching elements W on the array substrate AR using the poly-silicon TFT transistors.

The gate driver YD supplies scan signals (driving signals) to the n scanning lines Y, successively, under control of a controller CNT. The source driver XD supplies video signals to the pixels arranged in a selected row line at the timing when the switching elements arranged in each row line are rendered conductive by the scanning signals. As a consequence, the picture electrodes EP of pixels arranged in the selected row line are set at voltages corresponding to the video signals supplied through the switching elements W.

The first and second optical elements OD1 and OD2 include respective polarizers which are arranged so that each of the absorption axes crosses orthogonally. The first and second optical elements OD1 and OD2 may include retardation films which supply appropriate retardation to passing light.

According to this embodiment, a long axis of the liquid crystal molecules 40 is aligned in the vertical direction (e.g. in the normal line direction of the liquid crystal display panel LPN) when an electric field is not applied to the liquid crystal molecules 40. Under such condition, the light from the backlight unit is absorbed in the second optical element OD2 after passing the first optical element OD1 and the liquid crystal layer LQ. As a consequence, the transmission factor becomes lowest, that is, a black picture is displayed.

On the other hand, when an electric field is applied between the picture electrode EP and the counter electrode ET, the liquid crystal molecules 40 with a negative dielectric constant anisotropy are aligned in the orthogonal direction with respect to the electric field. The long axis of the liquid crystal molecules 40 are aligned approximately in a parallel direction or at a tilt with respect to the surface of the substrate. Under such condition, after the light from the backlight unit has passed the first optical element OD1, appropriate retardation is given to the light when the light passes the liquid crystal layer LQ. As a consequence, partial light from the backlight unit becomes possible to pass the second optical element OD2 and a white picture is displayed. Accordingly, a vertical align mode with a normally black mode is achieved.

In an embodiment of the invention, the liquid crystal display device adopts a multi domain structure in which a view angle can be compensated. In more detail, the liquid crystal display device includes an alignment control device to control the alignment of the liquid crystal molecules 40 under a condition in which an electric field is applied between the picture electrode EP and the counter electrode ET. The structure of the alignment control device will be explained in reference to FIG. 3 to FIG. 5.

Figure 3:
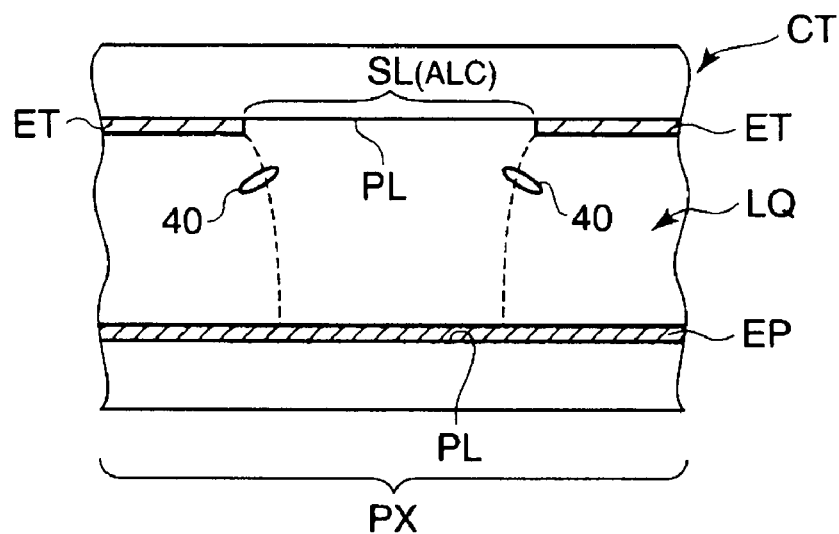
FIG. 3 is a cross sectional view showing an implementation of alignment control according to the first embodiment of the invention.

In an example shown in FIG. 3, the alignment control device ALC is formed on the counter substrate CT by providing a slit SL arranged linearly on the counter electrode ET. The slit SL is arranged so as to roughly cross the central portion of pixels facing the picture electrode EP.

Figure 4:
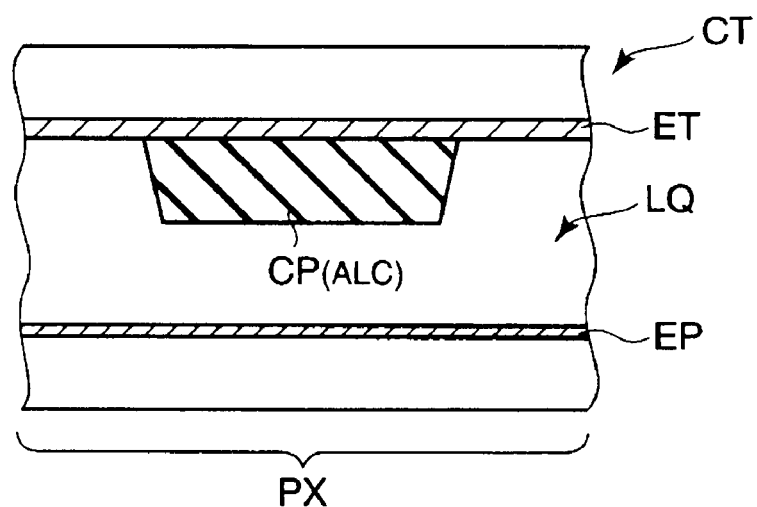
FIG. 4 is a cross sectional view showing another alignment control implementation according to the first embodiment of the invention.

In an example shown in FIG. 4, the alignment control device ALC is formed on the counter substrate CT by disposing a protrusion CP on the counter electrode ET linearly. The protrusion CP is arranged so as to roughly cross the central portion of pixels PX facing the picture electrode EP.

Figure 5:
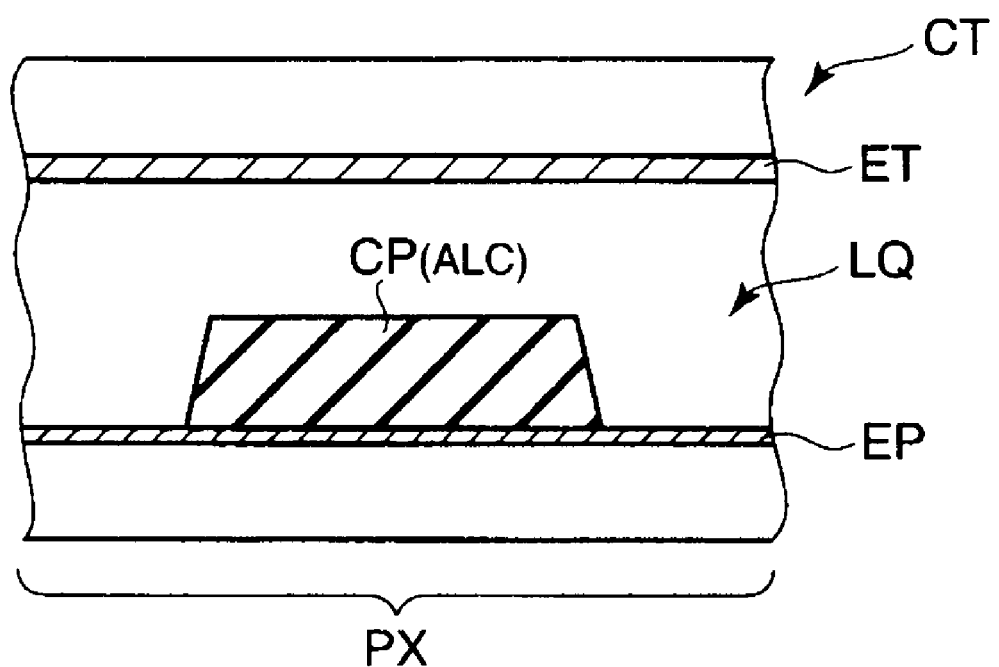
FIG. 5 is a cross sectional view showing a further alignment control implementation according to the first embodiment of the invention.

In an example shown in FIG. 5, the alignment control device ALC is formed on the array substrate AR by disposing a protrusion CP on the array substrate AR linearly. The protrusion CP is arranged so as to roughly cross the central portion of pixels facing the picture electrode EP.

In the case where a protrusion CP is adopted as an alignment control device ALC, the protrusion CP is formed of an insulation layer. As the insulation layer, for example, an inorganic layer of $SiO_2$, SiNx or $Al_2O_3$, or organic layer of polyimide, photoresist resin, or high polymer liquid crystal may be used. The protrusion CP made of the inorganic layer is deposited on the substrate using, for example, an evaporation deposition method, a sputtering method, CVD (Chemical Vapor Deposition) method or a solution coating method. Alternatively, the protrusion CP made of the organic material is deposited on the substrate using following methods. First, a solution of an organic substance or a solution of a precursor thereof is prepared and is coated by a spinner coating method, screen print coating method or a roll coating method, and the coated layer is cured under a predetermined curing condition (e.g. heating or light radiation). As alternative methods, the evaporation method, sputtering method, CVD method, or LB (Langumuir-Blodgett) method may be used.

In the case where the protrusion CP is formed of the organic material, the protrusion CP may be formed with a columnar spacer to maintain a gap between the substrates, using the same material and the same process. As is evident, the protrusion CP and the columnar spacer are formed on the same substrate.

In the liquid crystal display device having above alignment control device ALC, an electric field between the picture electrode EP and the counter electrode ET is formed so as to maintain the alignment control device ALC off. Therefore, it becomes possible to form a tilted electric field with respect to a normal line of the surface PL of the substrate around the alignment control device ALC between the picture electrode EP and a counter electrode ET. As a consequence, the liquid crystal molecules 40 are aligned around the alignment control device ALC to a predetermined direction by the tilted electric field. That is, two types of electric fields that are tilted in opposite directions are formed at an adjacent area of the alignment control device ALC interleaving the alignment control device ALC. Therefore, the liquid crystal molecules 40 of each pixel are also aligned in an opposite direction and it becomes possible to make a view wide angle by compensating the view angle. Further, it also becomes possible to make a contrast ratio large by adopting a normally black mode, which results in achieving a high quality of display.

Figure 6:
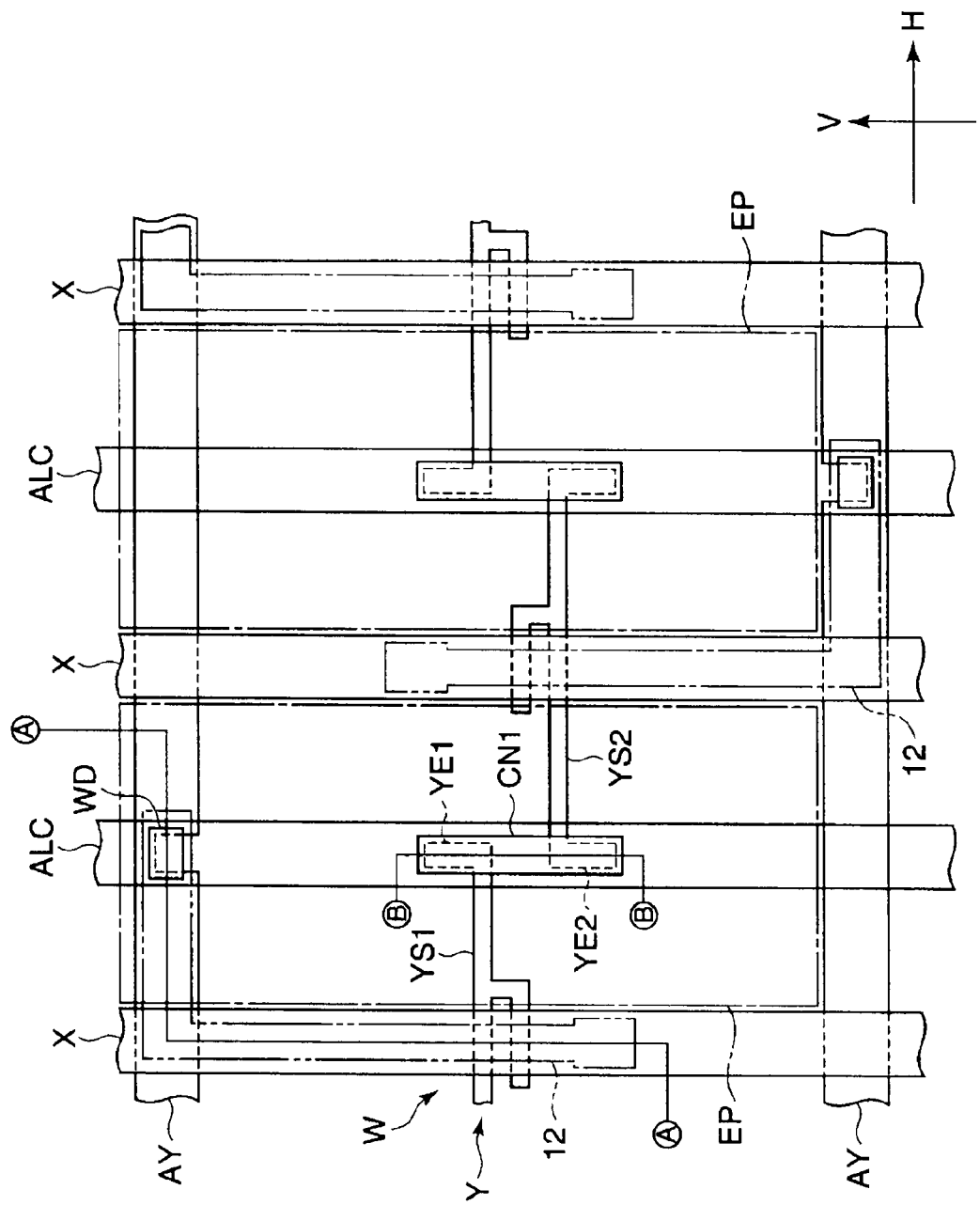
FIG. 6 is a plan view showing a structure of a pixel according to the first embodiment of the invention.
Figure 7:
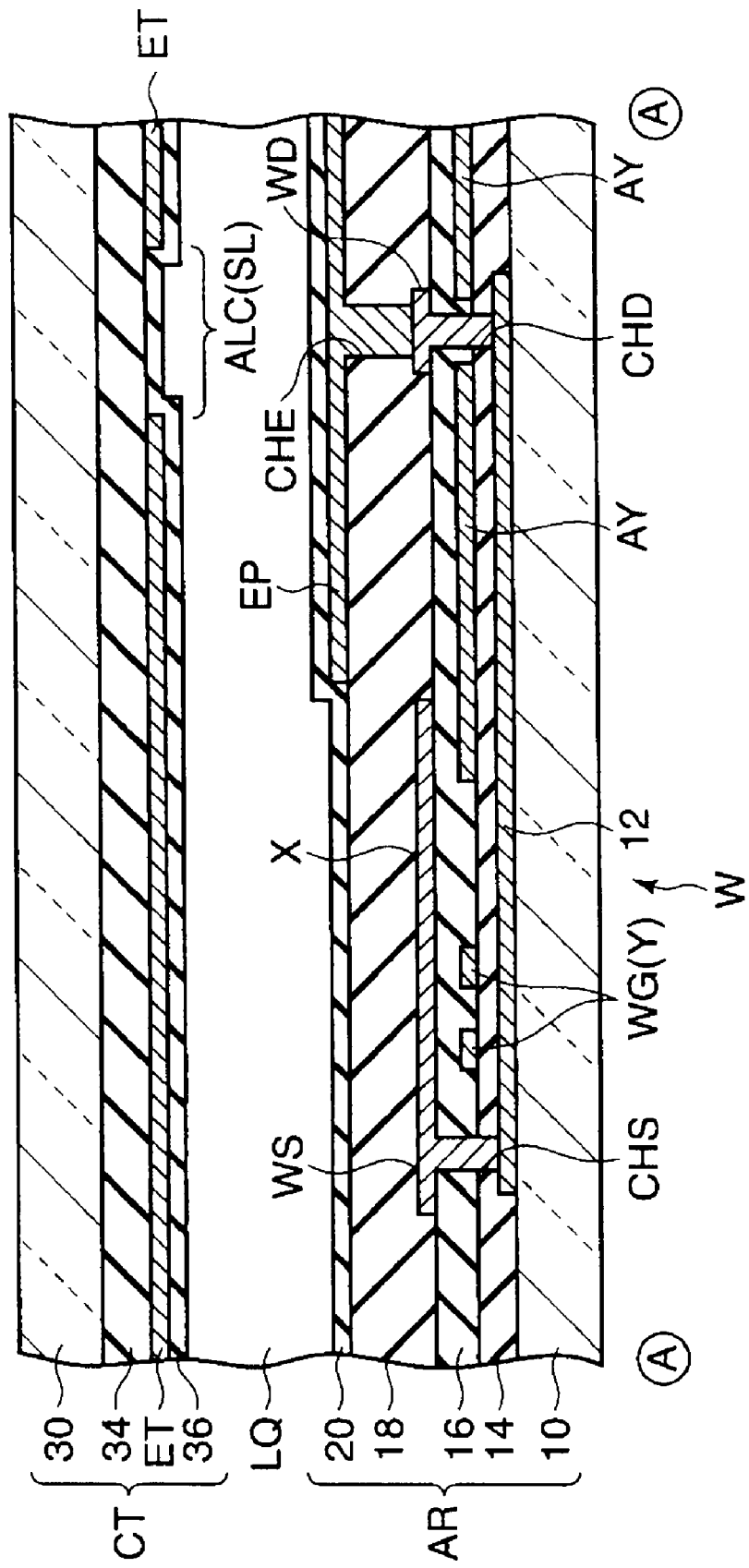
FIG. 7 is a cross sectional view of the liquid crystal display device taken along line A-A in the plan view show in FIG. 6 according to the first embodiment of the invention.

FIG. 6 and FIG. 7 show a first embodiment of the invention. FIG. 6 shows a pair of adjacent pixels in a row direction. A semiconductor layer 12 crosses the scanning line WG(Y) extending to the auxiliary capacitance line AY with an interposed gate insulation layer 14 so as to face the signal line X. Further, the semiconductor layer 12 extends to a contact hole CHD under the auxiliary capacitance line AY interposing the gate insulation layer 14 after having turned at a corner. The picture electrode EP faces the auxiliary capacitance line AY with an interposed insulation inter layer 16 and an insulation layer 18.

The semiconductor layer 12 and the signal line X (or source electrode WS) are connected through a contact hole CHS which penetrates the gate insulation layer 14 and the insulation inter layer 16. A cutting region is formed at a portion of the auxiliary capacitance line AY so as to expose the semi-conductor region 12. The drain electrode WD is connected to the exposed semiconductor region 12 through a contact hole CHD which penetrates the gate insulation layer 14 and the insulation inter layer 16. The drain electrode WD is connected to the picture electrode EP through a contact hole CHE which penetrates the insulation layer 18.

Figure 8:
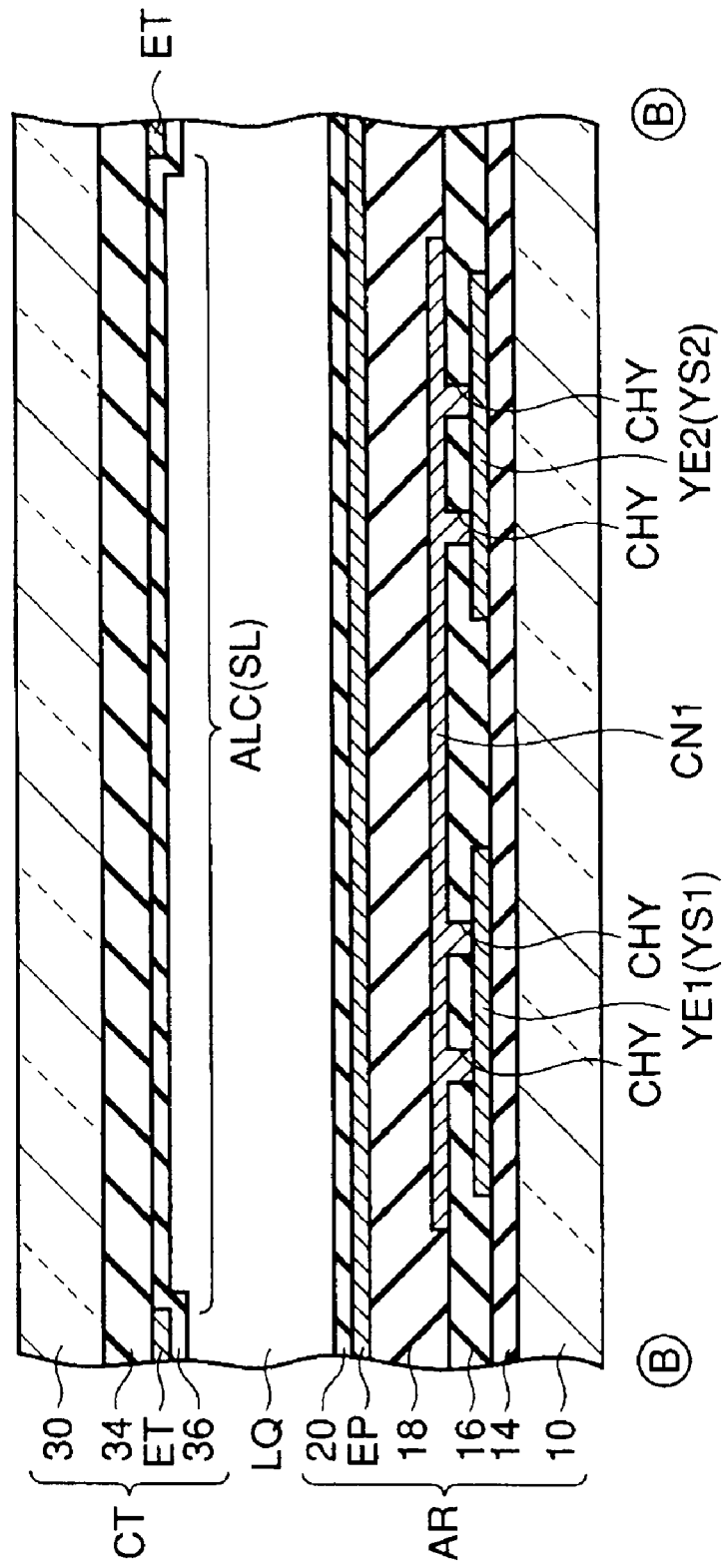
FIG. 8 is a cross sectional view of the liquid crystal display device taken along line B-B in the plan view show in FIG. 6 according to the first embodiment of the invention.

As shown in FIG. 6 and FIG. 8, the scanning line Y extends in the row direction roughly in the center of the pixel. The scanning line Y includes a first segment YS1 and a second segment YS2 apart from each other, which are formed on the gate insulation layer 14 using the same material and process. The first segment YS1 and the second segment YS2 are connected by a first connecting element CN1.

On the other hand, each pixel is provided with the alignment control device ALC. In FIG. 8, one example in which a slit SL is formed as the alignment control device ALC is shown. The first connecting element CN1 is arranged so as to face the alignment control device ALC. That is, the scanning line Y is divided at a region of the pixel facing the alignment control device ALC, and edge portions YE1 and YE2 of the first segment YS1 and second segment YS2 are connected by the first connecting element CN1.

According to above embodiment, the scanning line Y with a relatively large wiring capacitance is divided into two segments. Therefore, regional concentration of electro-static charges is suppressed and it becomes possible to suppress an electro-static destruction of the switching elements caused by a rising voltage. Further, the connection between the first and second segments YS1 and YS2 is made at the region facing the slit SL as the alignment control device ALC where the light from the backlight unit does not pass. Therefore, it is possible to protect the switching elements from the destruction by electro-static charges without lowering the aperture ratio which contributes to the quality of the display. In addition, it is desirable to form each segment YS of the scanning lines Y linearly so as to prevent the decrease of the aperture ratio in the area where the segments YS1 and YS2 are not overlapped with the alignment control device ALC.

Since the above-described first connecting element CN1 is arranged at the region where the display is not made in a pixel, flexibility of selection of the material to form the first connecting element CN1 can be increased. In this embodiment, the first connecting element CN1 may be formed by using the same material as the signal line X. That is, it is not desirable to make larger the resistance of the wiring to connect the divided wirings again. Meeting this requirement, it becomes possible to achieve a reliable connection without making the wiring resistance large, because, the first connecting element CN1 is formed by using the same material as the signal line X with a relatively low resistance. Even if the signal line X is formed of material having optically non-transmissive characteristic, the first connecting element CN1 does not cause a decrease in the aperture ratio.

In this embodiment, the first connecting element CN1 is formed on the insulation interlayer 16. The first connecting element CN1 connects the edge portions YE1 and YE2 of the first segment YS1 and the second segment YS2 through a contact hole CHY which penetrates the insulation interlayer 16. As is evident, the first connecting element CN1 may be formed by using the same process as the signal line X. Therefore, an additional process is not required to form the first connecting element CN1. The first connecting element CN1 may be formed so that the width of the first connecting element CN1 is designed larger than the edge portion YE of the segment YS. Therefore, enough margin for a mask shift with respect to the scanning line Y during the manufacturing process is achieved, which results in a reliable connection.

The first segment YS1 and the second segment YS2 extend in a row direction H in parallel each other and are arranged so as to be way out of line in the column direction V. That is, the first segment YS1 and the second segment YS2 are not arranged linearly. The edge portions YE1 and YE2 of respective segments YS are arranged in the column direction V within a region facing the alignment control device ALC. In the example shown in FIG. 6, the first segment YS1 and the second segment YS2 include edge portions YE1 and YE2 which face each other so as to curl in an opposite direction. In a pixel, the first segment YS1 and the second segment YS2 are arranged in an asymmetric fashion with a pattern layout which is repeated every adjacent two pixels. Accordingly, it becomes possible to get enough distance to suppress discharge of the electrostatic charges therebetween. The distance of the edge portions YE1 and YE2 may be designed without limitation in the region facing the alignment control device ALC, which results in raising of flexibility for patterning the edge portions. Further, it is possible to design the width of the edge portions YE1 and YE2 connected to the first connecting element CN1 large by curling the edge portions of respective segments YS1 and YS2, which results in increase of contact area for the first connecting element CN1.

Moreover, the number of contact holes where the first connecting element CN1 contacts with the edge portions YE1 and YE2 may be designed without limitation. In the example shown in FIG. 6, two contact holes are provided with the edge portions YE1 and YE2, however, more than two contact holes may be formed. That is, more than two contact holes provided with respective edge portions YE1 and YE2 may be formed by designing the area of respective edge portions YE1 and YE2 and the first connecting element CN1 larger in the region facing the alignment control device ALC. According to this example, it becomes possible to increase the number of contact holes CHY without affecting the aperture ratio of the pixel PX, which results in a low electric resistance of the scanning line Y. Moreover, even if some contact holes do not penetrate completely due to a patterning defect, the electrical connection using the other contact holes may be possible, that is, a redundant characteristic is obtained.

Inventors' analysis regarding a comparison between the wiring resistance of the scanning lines Y without divisions and with divisions has been conducted and the following has been confirmed. In the case where the scanning line Y is divided into two segments for one pixel, and each segment is connected by the first connecting element CN1 through one contact hole, the electric resistance of the scanning line Y tends to become larger comparing to the case where division is not made. However, rising and falling times of signals are within an allowable range. In the case where each segment is connected through with two contact holes by the first connecting element CN1, the increase of the electric resistance of the wiring is suppressed and the rising and falling times are improved.

Accordingly, it is possible to divide and connect the scanning line again using some types of layouts without limitation, and meeting various requirements. It is desirable that the alignment control device ALC extends in parallel with the first connecting element CN1. In the example shown in FIG. 6, the alignment control device ALC extends in the column direction V. The first connecting element CN1 also extends in the column direction V with the edge portions YE1 and YE2. According to such construction, the distance between the edge portions YE1 and YE2 may be designed without limitation and enough width of the first connecting element CN1 for connecting the edge portions YE1 and YE2 may be obtained.

Figure 9:
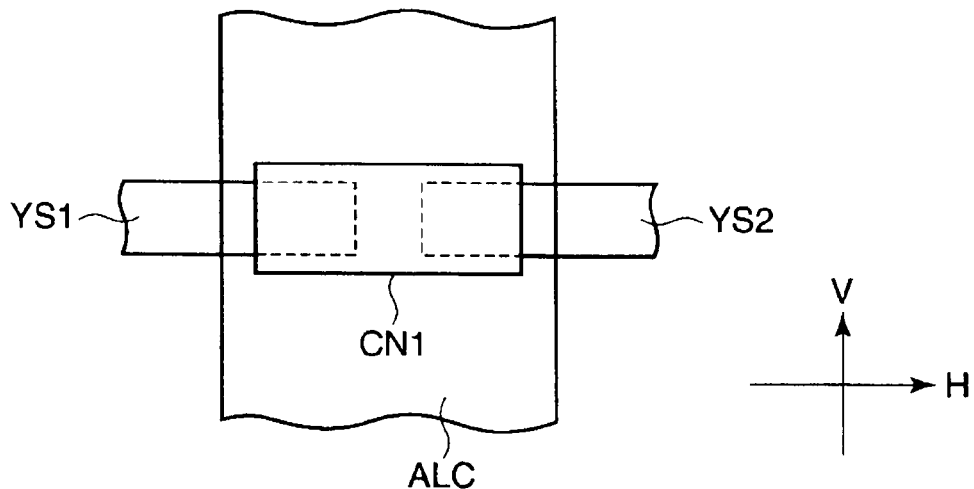
FIG. 9 is a plan view showing an example of connection elements to electrically connect segments of a gate electrode line.

The construction to connect the segments YS1 and YS2 is not limited to that shown in FIG. 6. That is, the first connecting element CN1 may be arranged without limitation if the connecting element CN1 is disposed in the region facing the alignment control device ALC. For example, the alignment control device ALC extends in the column direction V in an example shown in FIG. 9. The first connecting element CN1 also extends in the row direction H corresponding to the first and the second segments YS1 and YS2. That is, the extending directions of the alignment control device ALC and the first connecting element CN1 cross each other orthogonally.

Figure 10:
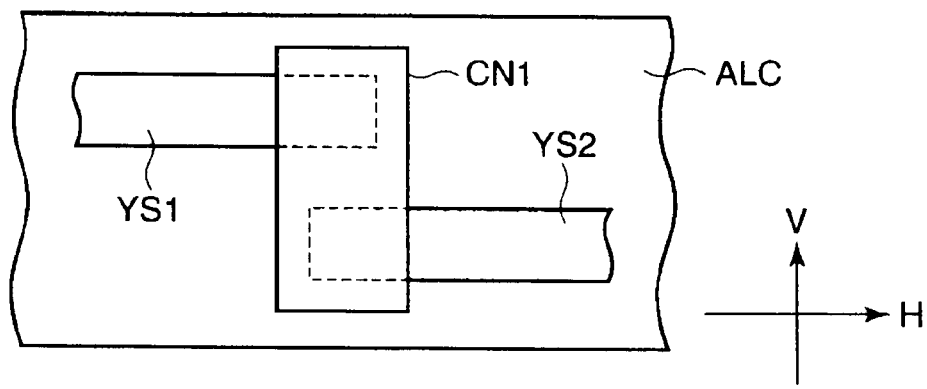
FIG. 10 is a plan view showing another example of a connection element to electrically connect segments.

In an example shown in FIG. 10, the alignment control device ALC extends in the row direction H. The first connecting element CN1 extends in the column direction V corresponding to the first and the second edge portions YE1 and YE2 of each segment. That is, the extending directions of the alignment control device ALC and the first connecting element CN1 cross each other orthogonally.

Figure 11:
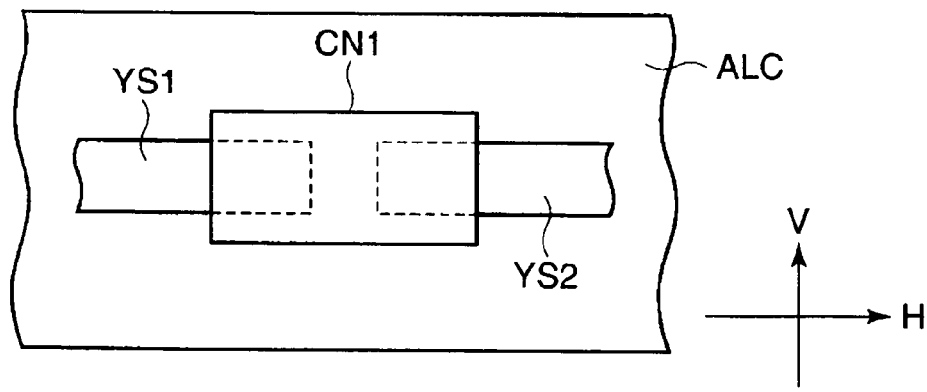
FIG. 11 is a plan view showing a further example of a connection element to electrically connect segments.

In the example shown in FIG. 11, the alignment control device ALC extends in the row direction H. The first connecting element CN1 extends in the row direction H corresponding to the first and the second segments YS1 and YS2. That is, extending directions of the alignment control device ALC and the first connecting element CN1 are in parallel with each other.

Figure 12:
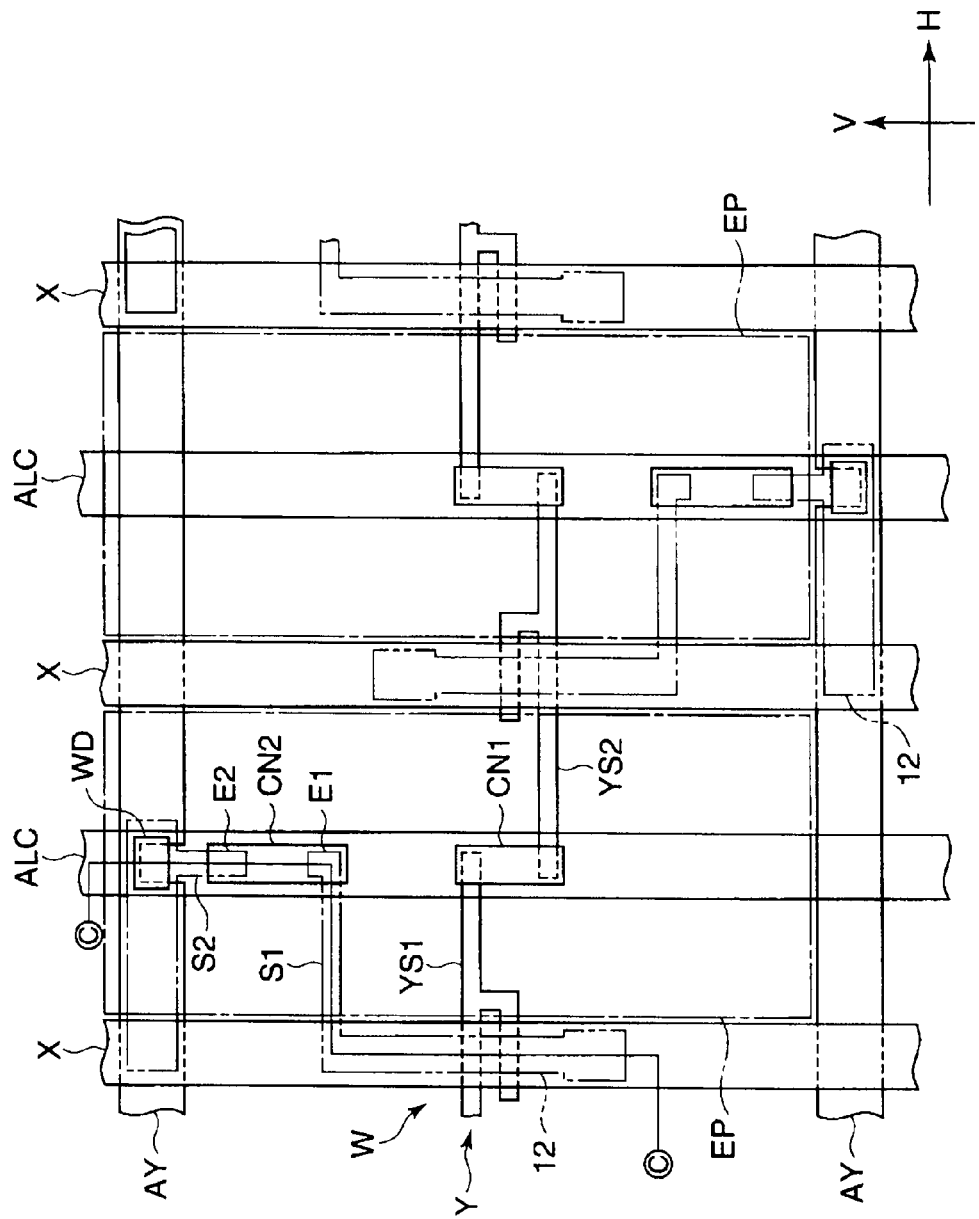
FIG. 12 is a plan view showing a structure of a pixel according to a second embodiment of the invention.
Figure 13:
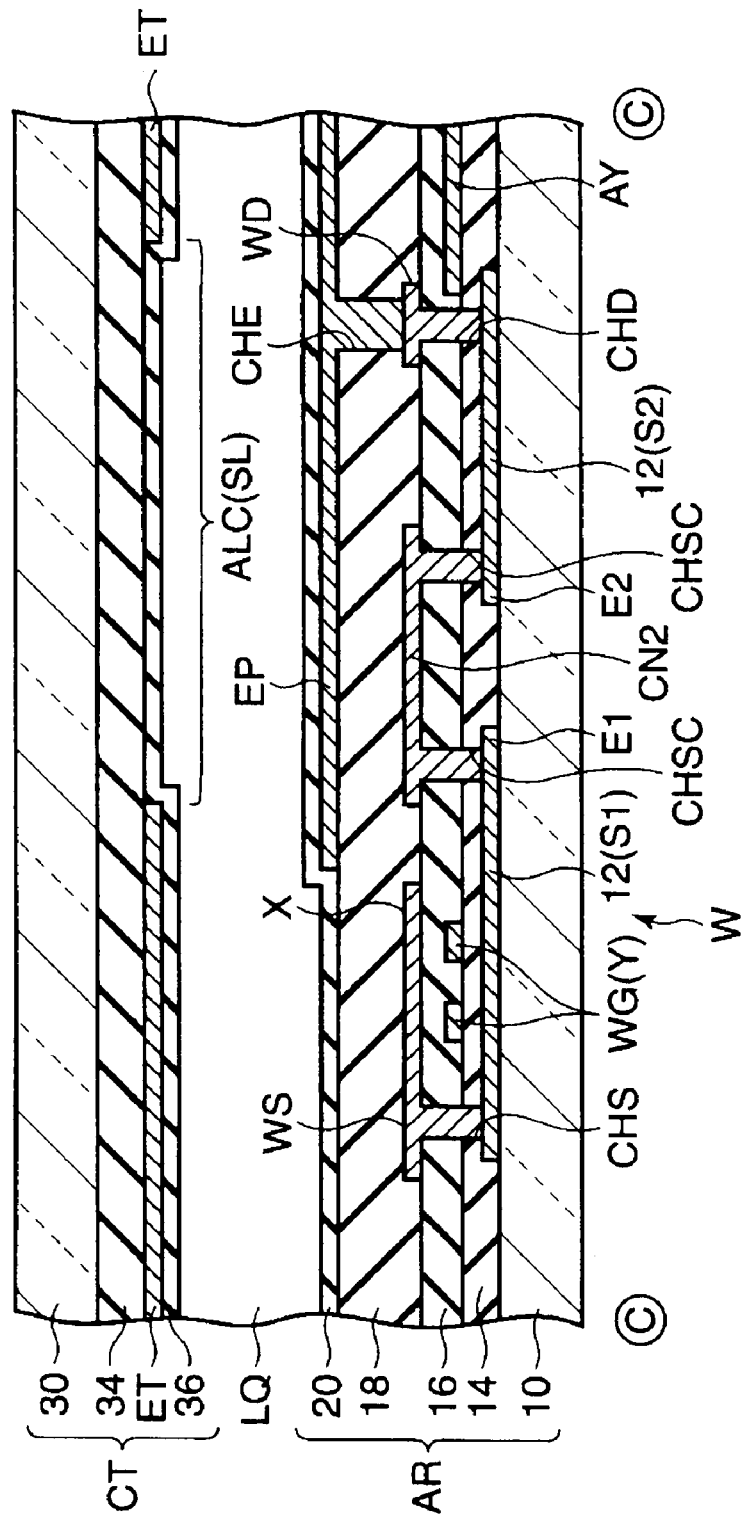
FIG. 13 is a cross sectional view of the liquid crystal display device taken along line C-C in the plan view show in FIG. 12 according to the second embodiment of the invention.

FIG. 12 and FIG. 13 show a second embodiment according to the invention. The semiconductor layer 12 on the substrate 10 extends under the signal line X with an interposed gate insulation layer 14 and insulation inter layer 16, and crosses the scanning line WG(Y). Then, the semiconductor layer 12 extends, after turning from the signal line X side, to the alignment control device ALC side crossing the pixel. Further, the semiconductor layer 12 extends to a drain electrode WD under the alignment control device ALC. In this embodiment, the semiconductor layer 12 is divided into two segments at a region which is located under the alignment control device ALC so as to separate the semiconductor layer 12 to the scanning line side and the auxiliary capacitance line side to eliminate unfavorable influence from the auxiliary capacitance line AY.

The first and the second segments S1 and S2 are formed using the same material and the same process, and connected by a second connecting element CN2. On the other hand, an alignment control device ALC (for example, a slit) is formed in each pixel. The semiconductor layer 12 is divided into two segments S1 and S2 at a region where the segments face the alignment control device ALC and are connected to each other through respective edge portions E1 and E2 by the second connecting element CN2.

According to such construction, inter influence between the scanning line Y and the auxiliary capacitance line AY may be eliminated by dividing the semiconductor layer 12 into the first segment S1 facing the scanning line Y and the second segment S2 facing the auxiliary capacitance line AY. As a consequence, electrostatic destruction caused by rising voltage of the scanning line or the auxiliary capacitance line AY may be suppressed.

Further, the connection of the segments S1 and S2 is made at the region where the segments S1 and S2 face the alignment control device ALC and the light from the back light unit does not pass. Therefore it becomes possible to devise a countermeasure against electrostatic destruction without decreasing the aperture ratio which substantially affects the brightness of the display. Since the above-described second connecting element CN2 is arranged in a region where the display is not made in a pixel, there arises increased flexibility of selection of the material to form the second connecting element CN2. In this embodiment, the second connecting element CN2 may be formed by using the same material as the signal line X. In this embodiment, the second connecting element CN2 is formed on the insulating inter layer 16 and connects the edge portions E1 and E2 of the first segment S1 and the second segment S2 through a contact hole CHSC which penetrates the insulation inter layer 16 and gate insulation layer 14. As is evident, the second connecting element CN2 may be formed by using the same process as the signal line X. Therefore, an additional process is not required to form the second connecting element CN2.

As in the first embodiment, it is possible to divide and connect again the semiconductor layer using some layouts in the region facing the alignment control device ALC without limitation and meeting various requirements. Such designs as the shape of respective edge portions E1 and E2 of the segments S1 and S2, the distance therebetween, the shape of the second connecting element CN2 and the number of contact holes are changeable in the region facing the alignment control device ALC, as needed.

FIG. 12 also shows an embodiment in which both the scanning line Y and the semiconductor layer 12 are divided into two segments, respectively. The embodiment to divide the scanning line Y is same as that shown in FIG. 6 and FIG. 7.

Especially, in case where the first embodiment and the second embodiment are combined, it is desirable to arrange the first and the second connecting elements N1 and N2 in parallel with the alignment control device ALC so that the first and the second connecting elements N1 and N2 overlap with the alignment control device ALC. Accordingly, it becomes possible to divide and again connect the scanning line Y and the semiconductor layer 12 using some layouts in the small area facing the alignment control device ALC without limitation and meeting various requirements.

Next, a third embodiment of the invention will be explained referring to FIG. 14 to FIG. 16. In this embodiment, the auxiliary capacitance line AY is divided into two segments so as to disperse a localized concentration of electro-static charges on the surface of the auxiliary capacitance line AY. The auxiliary capacitance line AY is divided at a region between the alignment control device ALC and the signal line X.

According to the third embodiment, the auxiliary capacitance line AY includes a first segment AS1 and second segment AS2 apart from each other. The first segment AS1 and the second segment AS2 extend in the row direction H along the periphery of the pixel and face the periphery of the picture electrode EP with the insulation interlayer 16 and the gate insulation layer 14 interposed therebetween. The first segment AS1 and the second segment AS2 are formed on the gate insulation layer 14, and are connected to each other by a third connecting element CN3. The auxiliary capacitance line AY is divided in a turned shape to minimize the connection area.

According to above embodiment, the auxiliary capacitance line AY with a relatively large wiring capacitance is divided into two segments AS1 and AS2. Therefore, regional concentration of electrical charges is suppressed and it becomes possible to suppress the electrostatic destruction of switching elements due to rising voltage.

Figure 15:
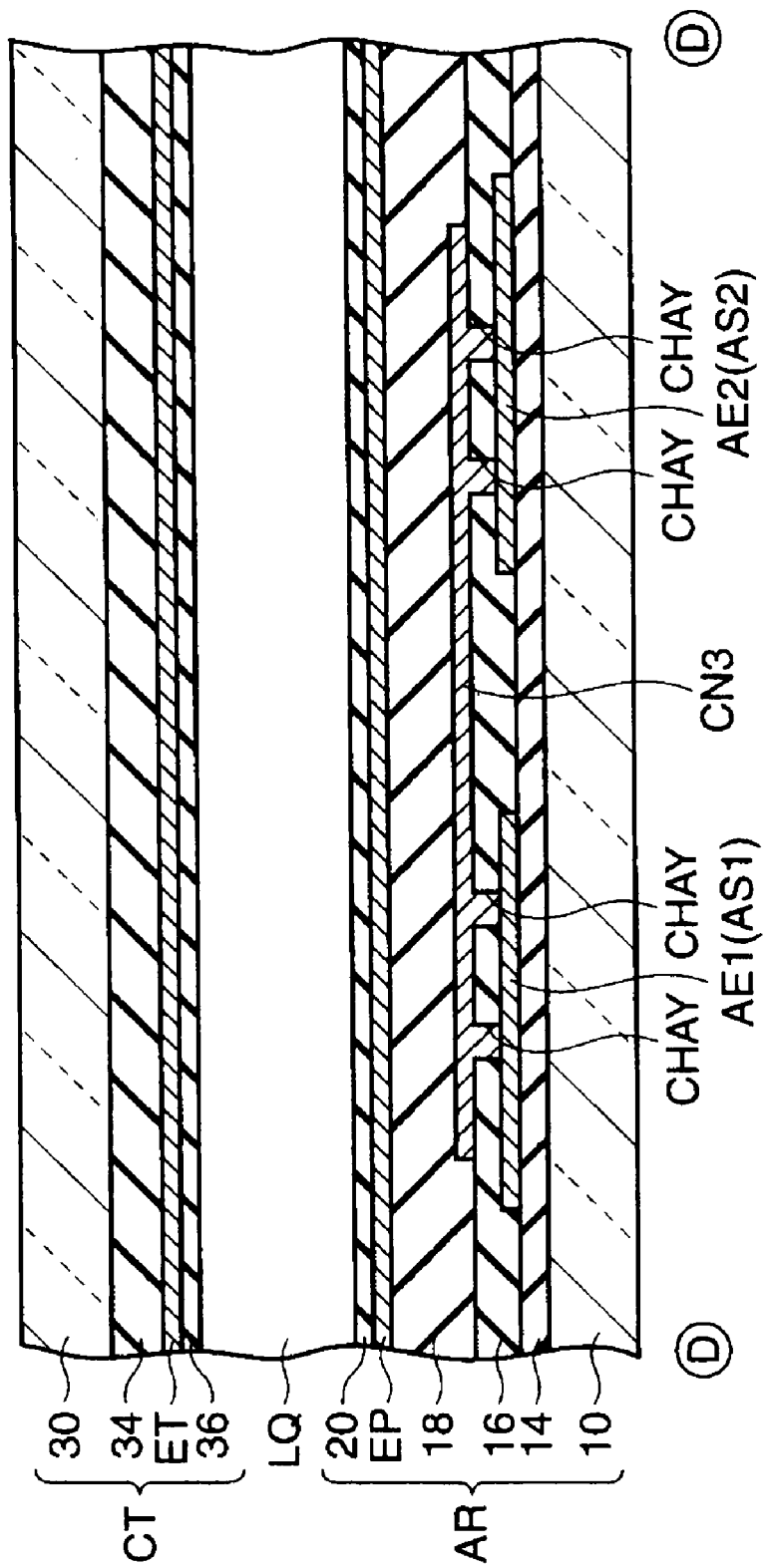
FIG. 15 is a cross sectional view of the liquid crystal display device taken along line D-D in the plan view show in FIG. 14 according to the third embodiment of the invention.
Figure 16:
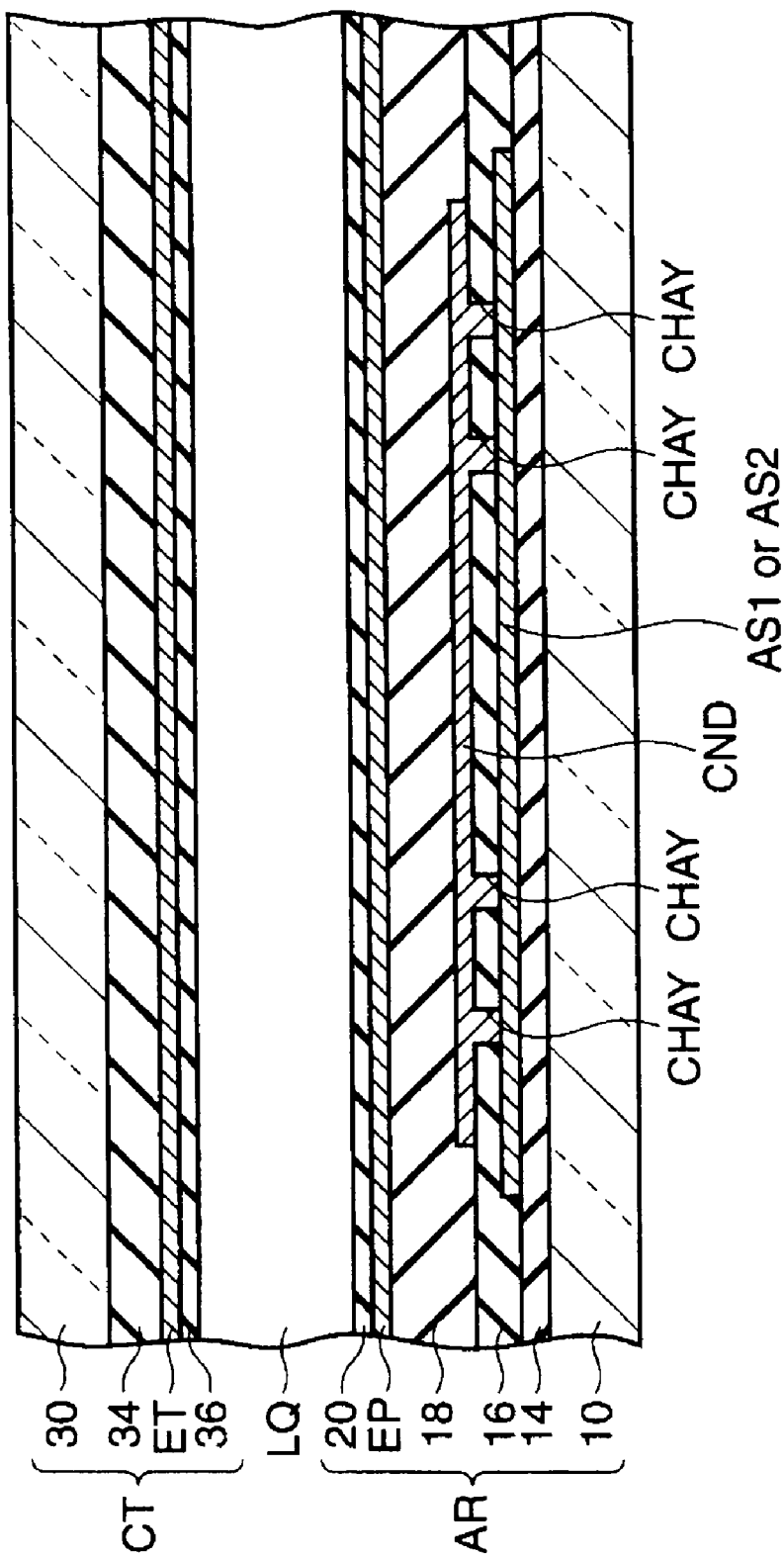
FIG. 16 is a cross sectional view showing a structure of a dummy connection element, which is applicable to the pixel according to the third embodiment of the invention.

In this embodiment, the third connecting element CN3 is formed on the insulation interlayer 16 and connects the edge portions AE1 and AE2 of the first segment AS1 and the second segment AS2 through a contact hole CRAY which penetrates the insulation interlayer 16 as shown in FIG. 15. As is evident, the third connecting element CN3 may be formed by using the same process as the signal line X. Therefore, an additional process is not required to form the third connecting element CN3. In this embodiment, though the auxiliary capacitance line AY is divided into two segments and connected by the third connecting elements CN3 for every one pixel, the auxiliary capacitance line AY may be divided for every predetermined number of pixels, which results in suppressing the increase of wiring resistance or degradation of scan signal wave.

According to the inventor's analysis, in case that a liquid crystal display device includes 480 pixels consisting of three sub-pixels of red, green and blue colors (e.g., 480×3 pixels) and that the auxiliary capacitance line AY is divided every 24 pixels, it is confirmed that the division of the auxiliary capacitance line AY does not affect the quality of the displayed pictures. In this embodiment in which the auxiliary capacitance line AY is divided every predetermined number of pixels, it is desirable to provide a dummy connecting element CND through a contact hole which penetrates the insulation inter layer 16 as shown in FIG. 16. That is, the dummy connecting element CND is not to connect the divided two segments AS1 and AS2 but to make same construction as that of real connection. The dummy connecting element CND contacts with a continuous auxiliary capacitance line AY. Since it is desirable to form the dummy connecting element CND with the same construction as that of the third connecting element CN3, the dummy connecting element CND contacts with the auxiliary capacitance line AY through the same number of contact holes CHAY (e.g. two contact holes in this embodiment). Accordingly, almost all pixels have the same construction and the dispersion of display characteristic among pixels may be reduced.

Further, it is desirable to arrange the portions to be divided in random fashion, especially avoiding portions to be lined in the column direction so that the divided portions are not easily recognized as an even brightness of display.

In the embodiment in which each pixel includes three sub-pixels of red color, green color, and blue color, it is desirable to arrange the third connecting element CN3 in a sub-pixel whose sensitiveness is lowest (e.g. blue color pixel) so as to connect the divided segments. Accordingly, even if there were non-uniformity of the display, such non-uniformity is not easily recognized. Further, where light leak at the divided portions occurs, the light leak is not easily recognized.

According to this invention, there is provided high quality liquid crystal display device having a wide viewing angle and high contrast without causing decrease of an aperture ratio.

Figure 14:
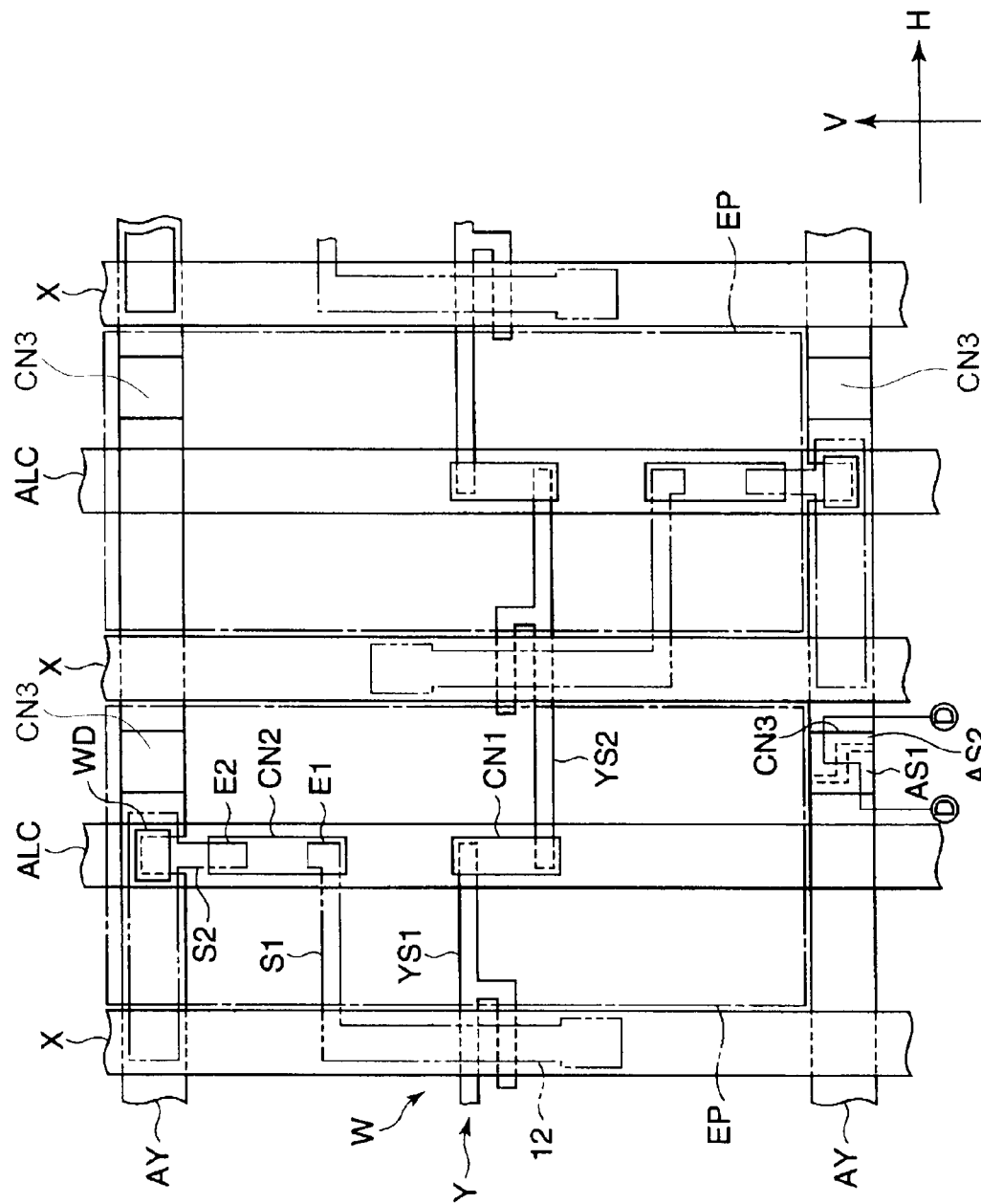
FIG. 14 is a plan view showing a structure of a pixel according to a third embodiment of this invention.

FIG. 14 also shows an arrangement in which the scanning line X and the semiconductor layer 12 are divided into two segments with the auxiliary capacitance line AY, respectively. The arrangements to divide the scanning line Y and the semiconductor layer 12 are same as those shown in FIG. 6 and FIG. 12.

In the above embodiments, the scanning line Y, the semiconductor layer 12 and the auxiliary capacitance line AY are divided into two segments; however, they may be divided into more than two segments.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understood that within the scope of the appended claims, the present invention may be practiced other than as specifically disclosed herein.

What is claimed is:
1. A liquid crystal display device comprising:
an array substrate including pixels arranged in a matrix, a picture electrode provided for each pixel, a scanning line extending in a row direction and a signal line extending in a column direction interposed with an insulation layer;

a counter substrate including a common counter electrode for the plurality of pixels, the counter substrate facing the array substrate;

a liquid crystal layer including liquid crystal molecules held between the array substrate and the counter substrate, wherein the liquid crystal molecules are aligned substantially in a direction normal to a surface of the substrates under a condition where no electric field is applied between the picture electrodes and the counter electrode; and an alignment control device configured to control the alignment of the liquid crystal molecules under a condition where an electric field is applied between the picture electrodes and the counter electrode, the alignment control device crossing the pixel so as divide the pixel into first and second display areas, wherein the scanning line includes first and second segments respectively corresponding to the first and second display areas in each pixel, wherein the array substrate further includes a connecting element to connect the first and second segments of the scanning lines opposite the alignment control device, and wherein the first and second segments extend in the row direction in parallel with each other and are shifted in the column direction.

2. The liquid crystal display device according to claim 1, wherein the connecting element is formed of the same material as the signal line and contacts with the first and second segments through a contact hole to penetrate an insulation layer.

3. The liquid crystal display device according to claim 1, wherein the alignment control device comprises a slit formed on the counter electrode.

4. The liquid crystal display device according to claim 1, wherein the alignment control device comprises a protrusion formed on the counter electrode.

5. A liquid crystal display device comprising:

an array substrate including pixels arranged in a matrix, a picture electrode provided for each pixel, a scanning line extending in a row direction and a signal line extending in a column direction interposed with an insulation layer;

a counter substrate including a common counter electrode for the plurality of pixels, the counter substrate facing the array substrate;

a liquid crystal layer including liquid crystal molecules held between the array substrate and the counter substrate, wherein the liquid crystal molecules are aligned substantially in a direction normal to a surface of the substrates under a condition where no electric field is applied between the picture electrodes and the counter electrode; and an alignment control device configured to control the alignment of the liquid crystal molecules under a condition where an electric field is applied between the picture electrodes and the counter electrode, the alignment control device crossing the pixel so as divide the pixel into first and second display areas, wherein the scanning line includes first and second segments respectively corresponding to the first and second display areas in each pixel, wherein the array substrate further includes a connecting element to connect the first and second segments of the scanning lines opposite the alignment control device, and wherein the alignment control device and the connecting element extend in parallel with each other.

6. The liquid crystal display device according to claim 5, wherein the connecting element is formed of the same material as the signal line and contacts with the first and second segments through a contact hole to penetrate an insulation layer.

7. The liquid crystal display device according to claim 5, wherein the alignment control device comprises a slit formed on the counter electrode.

8. The liquid crystal display device according to claim 5, wherein the alignment control device comprises a protrusion formed on the counter electrode.

* * * * *